United States Patent
Lyons

(10) Patent No.: US 11,898,672 B2
(45) Date of Patent: Feb. 13, 2024

(54) SUPPORT FOR EXHAUST STACK

(71) Applicant: International Truck Intellectual Property Company, LLC, Lisle, IL (US)

(72) Inventor: Timothy M. Lyons, Batavia, IL (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 23 days.

(21) Appl. No.: 17/681,374

(22) Filed: Feb. 25, 2022

(65) Prior Publication Data
US 2023/0272871 A1   Aug. 31, 2023

(51) Int. Cl.
*F16L 27/02* (2006.01)
*F01N 13/18* (2010.01)

(52) U.S. Cl.
CPC .......... *F16L 27/02* (2013.01); *F01N 13/1816* (2013.01)

(58) Field of Classification Search
CPC ................... F01N 13/18–1894; F01N 2260/10
See application file for complete search history.

(56) References Cited

U.S. PATENT DOCUMENTS

| | | | |
|---|---|---|---|
| 4,465,252 A * | 8/1984 | Donovan, Jr. | F16L 3/20 248/589 |
| 4,471,853 A | 9/1984 | Callaghan et al. | |
| 4,753,772 A * | 6/1988 | Schmertz | F16L 3/16 188/371 |
| 5,127,489 A * | 7/1992 | Takato | B60K 13/04 248/60 |
| 5,649,685 A | 7/1997 | Keller | |
| 5,873,429 A | 2/1999 | Qutub | |
| 6,095,460 A | 8/2000 | Mercer et al. | |
| 6,637,538 B2 | 10/2003 | Morykon et al. | |
| 7,416,038 B2 | 8/2008 | Etzler | |
| 7,614,475 B2 | 11/2009 | Askew | |
| 8,196,958 B2 | 6/2012 | Cordea | |
| 10,669,917 B1 * | 6/2020 | Atwell | F01N 13/082 |
| 2006/0175104 A1 | 8/2006 | Etzler et al. | |
| 2008/0283328 A1 | 11/2008 | Askew | |
| 2012/0012731 A1 * | 1/2012 | Johnson | F01N 13/1822 248/638 |

FOREIGN PATENT DOCUMENTS

DE   2502925 A1 *  1/1975

OTHER PUBLICATIONS

English Abstract of DE 2502925 A1 (combined with foreign copy) Date: Jan. 1975.*

* cited by examiner

*Primary Examiner* — Mickey H France
(74) *Attorney, Agent, or Firm* — Mark C. Bach; Umang Khanna

(57) ABSTRACT

A support for an exhaust stack comprises a first bracket including a first base joining a first extension and a second extension, the first base being fixed to the vehicle, and a second bracket including a second base joining a third extension and a fourth extension, the second base being fixed to the exhaust stack. A member is disposed between the first base and the second base. The member has a first end and a second end. A first fastener is accepted by the first end and extends between the first extension and the second extension. A second fastener is accepted by the second end and extends between the third extension and the fourth extension.

3 Claims, 2 Drawing Sheets

SUPPORT FOR EXHAUST STACK

BACKGROUND

This disclosure relates generally to a support. More specifically, this disclosure relates to a support for an exhaust stack on a vehicle powered by a diesel engine.

A vehicle powered by a diesel engine may include a pipe or stack that directs exhaust of the diesel engine away from the vehicle. Some stacks may incorporate a sizeable support bracket coupling the stack to a frame of the vehicle. Such a support bracket may increase cost and mass of a vehicle and compromise vehicle aerodynamics thereby decreasing fuel economy of the vehicle. Accordingly, it is desirable to provide an improved support for an exhaust stack.

SUMMARY

This disclosure comprises embodiments of a support for exhaust stack. One embodiment is a support comprising a first bracket including a first base joining a first extension and a second extension, the first base being fixed to the vehicle, and a second bracket including a second base joining a third extension and a fourth extension, the second base being fixed to the exhaust stack. A member is disposed between the first base and the second base. The member has a first end and a second end. A first fastener is accepted by the first end and extends between the first extension and the second extension. A second fastener is accepted by the second end and extends between the third extension and the fourth extension.

DETAILED DESCRIPTION

This disclosure relates to an embodiment of a support 10 for an exhaust stack 12 on a vehicle 14 powered by a diesel engine. Applications of other embodiments of the support 10 may not include a vehicle 14 or a diesel engine, and the exhaust stack 12 may be replaced by another element such as a beam, a post and the like. All embodiments of the support 10 offer vibration attenuation while permitting limited movement between a first body, such as the exhaust stack 12, and a second body, such as the vehicle 14.

Figure 1:
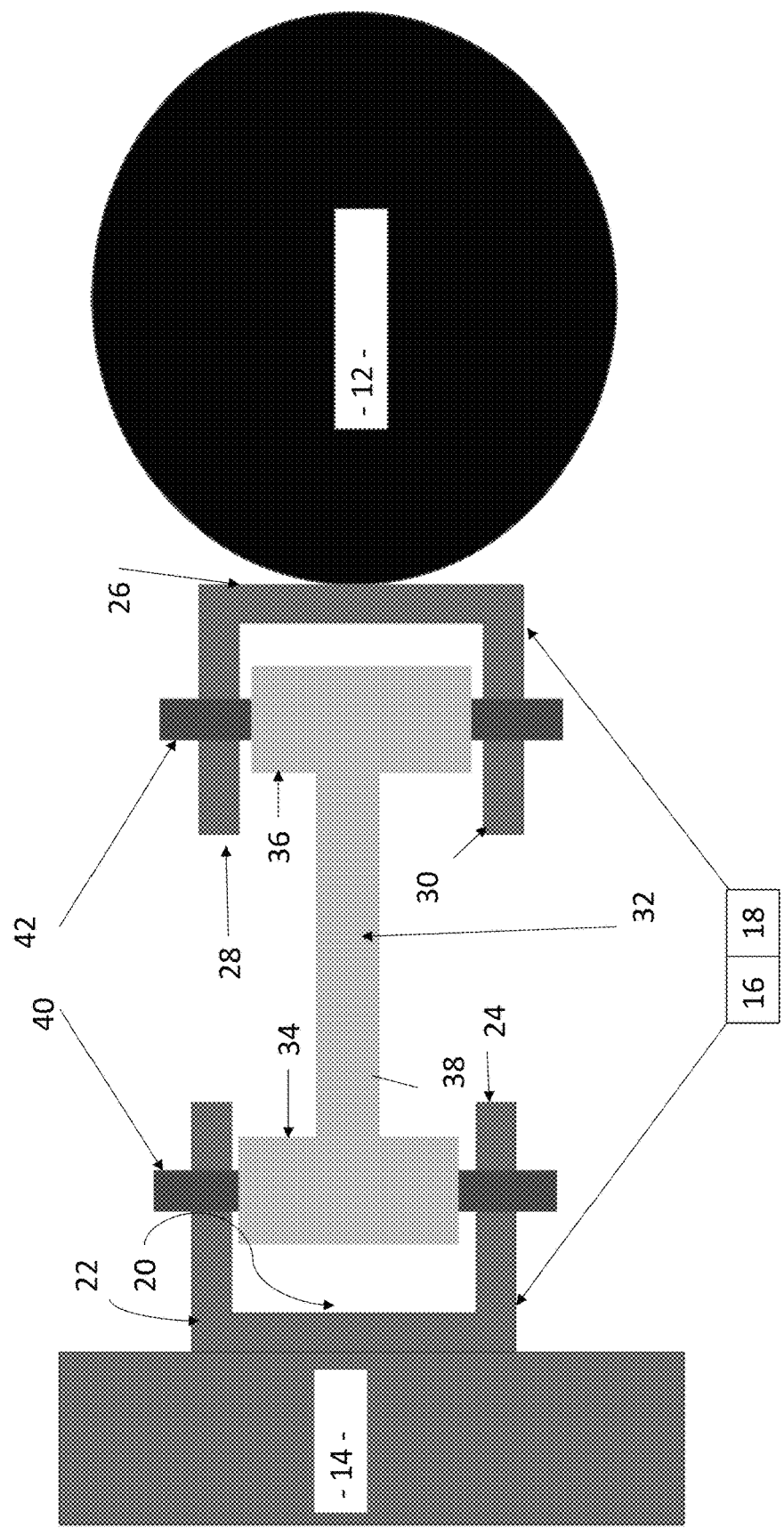
FIG. 1 is a top view of an embodiment of a support for exhaust stack described herein.
Figure 2:
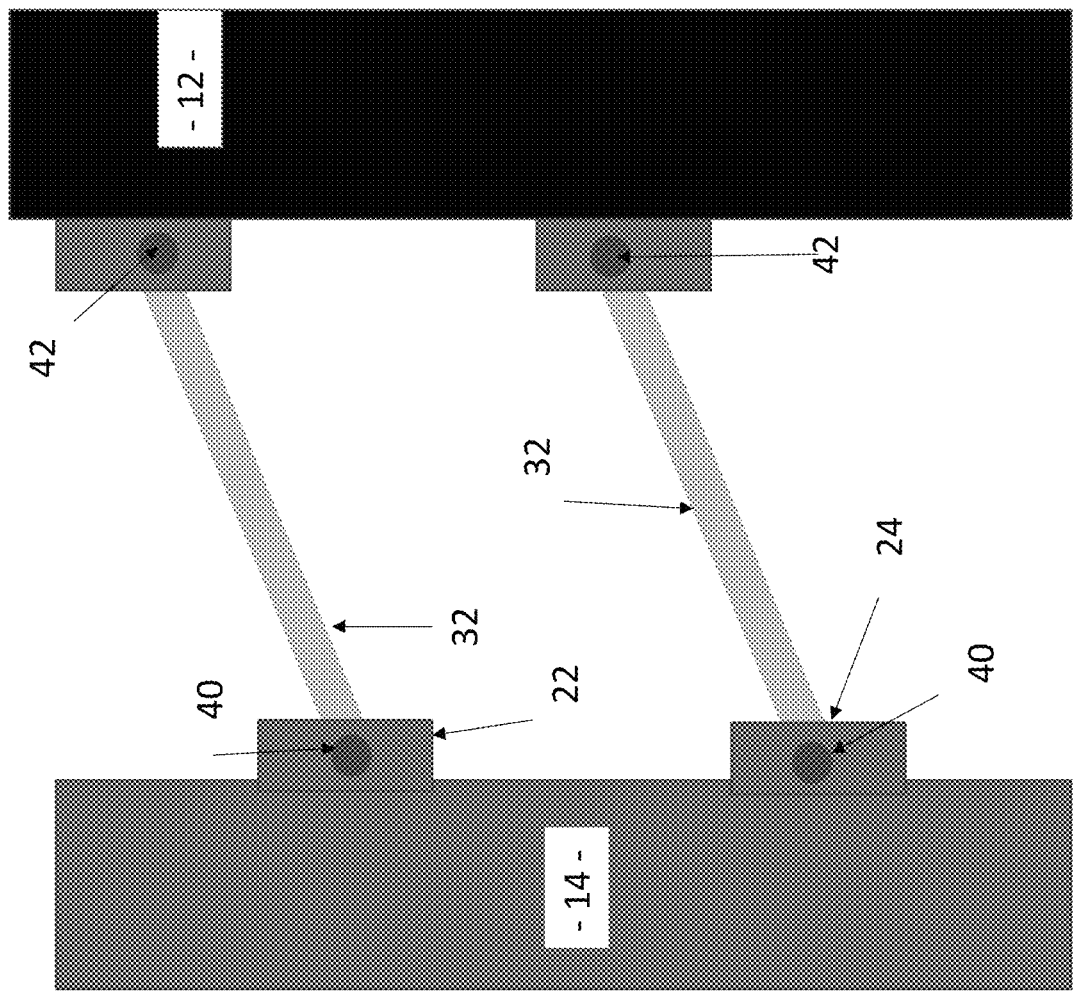
FIG. 2 is a side view of the support for exhaust stack of FIG. 1.

A top view of this embodiment is shown in FIG. 1 and a side view of this embodiment is shown in FIG. 2. This embodiment comprises multiple substantially identical assemblies disposed along the exhaust stack 12. While two (2) assemblies are shown in FIG. 2, other embodiments may comprise more or less assemblies.

FIG. 1 shows that the support 10 comprises a first bracket 16 and a second bracket 18. The first bracket 16 includes a first base 20 joining a first extension 22 and a second extension 24. The first base 20 of the first bracket 16 is fixed, such as by welding and the like, to a portion, such as a cab and the like, of the vehicle 14. In some embodiments, the first base 20 is formed integrally with the cab of the vehicle 14. The second bracket 18 includes a second base 26 joining a third extension 28 and a fourth extension 30. The second base 26 is fixed, such as by welding and the like, to a portion of the exhaust stack 12. In some embodiments, the second base 26 is formed integrally with the exhaust stack 12.

The first extension 22 is offset from the second extension 24 by a distance equal to a distance between the third extension 18 and the fourth extension 30. A member 32 is disposed between the first base 20 and the second base 26. The member 32 has a first end 34 and a second end 36 joined by a leg 38. The first end 34 accepts a first fastener 40, such as a bolt and the like, extending between the first extension 22 and the second extension 24. The second end 36 accepts a second fastener 42, such as a bolt and the like, extending between the third extension 28 and the fourth extension 30. In some embodiments, at least one of the first fastener 40 and the second fastener 42 may comprise multiple fasteners such as a fastener extending between the first extension 22 and the first end 34. In some embodiments, the member 32 comprises a flexible material, such as an elastomer and the like. In these embodiments, the elastomeric member 32 may attenuate vibration experienced by at least one of the cab 14 and the exhaust stack 12. Also, the elastomeric member 32 may permit relative motion of the cab 14 and the exhaust stack 12. In some embodiments, the member 32 may include a reenforcing element, not shown for clarity, such as a steel shim and the like. In some embodiments, the member 32 may be replaceable as desired.

What is claimed is:

1. A support for an exhaust stack on a vehicle, the support comprising:
   a first bracket including a first base joining a first extension and a second extension, the first base being fixed to the vehicle;
   a second bracket including a second base joining a third extension and a fourth extension, the second base being fixed to the exhaust stack;
   a member is disposed between the first base and the second base, the member has a first end and a second end;
   a first fastener accepted by the first end and extending between the first extension and the second extension; and
   a second fastener accepted by the second end and extending between the third extension and the fourth extension.

2. The support as defined in claim 1 wherein the member comprises a flexible material.

3. The support as defined in claim 2 wherein the flexible material is an elastomer.

* * * * *